(12) United States Patent
Kajiyama et al.

(10) Patent No.: US 12,081,138 B2
(45) Date of Patent: Sep. 3, 2024

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Ryosuke Uda, Tokyo (JP); Yoshiyuki Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 17/797,272

(22) PCT Filed: Mar. 11, 2020

(86) PCT No.: PCT/JP2020/010630
§ 371 (c)(1),
(2) Date: Aug. 3, 2022

(87) PCT Pub. No.: WO2021/181580
PCT Pub. Date: Sep. 16, 2021

(65) Prior Publication Data
US 2023/0056080 A1    Feb. 23, 2023

(51) Int. Cl.
*H02M 7/219* (2006.01)
*H02M 1/08* (2006.01)
*H02M 1/32* (2007.01)

(52) U.S. Cl.
CPC ............. *H02M 7/219* (2013.01); *H02M 1/08* (2013.01); *H02M 1/32* (2013.01)

(58) Field of Classification Search
CPC ........ H02M 1/08; H02M 1/084; H02M 1/088; H02M 1/32; H02M 7/219; H02M 7/23;
(Continued)

(56) References Cited

U.S. PATENT DOCUMENTS

2019/0044427 A1    2/2019  Fujii et al.
2019/0068076 A1*   2/2019  Uda .................... H02M 7/483
(Continued)

FOREIGN PATENT DOCUMENTS

JP          6509352 B2   5/2019
WO      2019138550 A1   7/2019

OTHER PUBLICATIONS

Darus, et al., "Controllers for Eliminating the ac Components in the Circulating Current of Modular Multilevel Converters", IET Power Electron, vol. 9, Issue No. 1, 2016, pp. 1-8.
(Continued)

*Primary Examiner* — Nguyen Tran
(74) *Attorney, Agent, or Firm* — Buchanan Ingersoll & Rooney PC

(57) ABSTRACT

A power conversion device includes a power conversion circuit unit including a plurality of leg circuits. Each of the leg circuits includes a plurality of converter cells each having a capacitor and connected in series to each other. Each of the plurality of converter cells is a first converter cell including at least two switching elements or a second converter cell including at least four switching elements. The power conversion device further includes a control device. The control device operates the plurality of the first converter cells that are controlled not based on a circulating current circulating between the plurality of leg circuits as a voltage source that outputs a circulating voltage in a circulation circuit indicating a closed circuit that does not include a DC circuit and an AC circuit, and operates the plurality of the second converter cells to control the circulating current in the circulation circuit.

20 Claims, 7 Drawing Sheets

(58) Field of Classification Search
CPC ........ H02M 7/25; H02M 7/213; H02M 7/217; H02M 7/19; H02M 7/17; H02M 7/162; H02M 7/1623; H02M 7/1626; H02M 7/08

See application file for complete search history.

(56) References Cited

U.S. PATENT DOCUMENTS

| | | | |
|---|---|---|---|
| 2019/0207533 A1* | 7/2019 | Kikuchi | H02M 7/48 |
| 2021/0058007 A1 | 2/2021 | Hario et al. | |
| 2021/0091661 A1* | 3/2021 | Kono | H02M 7/4835 |

OTHER PUBLICATIONS

Extended European Search Report dated Mar. 20, 2023, issued in the corresponding European Patent Application No. 20924710.5, 12 pages.

Judge, et al., "Thyristor/Diode-Bypassed Submodule Power Groups for Improved Efficiency in Modular Multilevel Converters", IEEE Transactions on Power Delivery, vol. 34, No. 1, Feb. 2019, pp. 84-94.

Perez, et al., "Generalized Modeling and Simulation of a Modular Multilevel Converter", IEEE International Symposium on Industrial Electronics, Jun. 27, 2011, pp. 1863-1868.

International Search Report (PCT/ISA/210) with translation and Written Opinion (PCT/ISA/237) mailed on Jun. 23, 2020, by the Japan Patent Office as the International Searching Authority for International Application No. PCT/JP2020/010630. (8 pages).

* cited by examiner (a)  (b)

POWER CONVERSION DEVICE

TECHNICAL FIELD

The present disclosure relates to a power conversion device that performs power conversion between an alternating current and a direct current.

BACKGROUND ART

A modular multilevel converter (hereinafter, also referred to as an MMC converter) in which a plurality of unit converters are connected in cascade can easily cope with an increase in voltage by increasing the number of unit converters. The "unit converter" is also referred to as a "converter cell" or a "sub-module". The MMC converter is widely applied to a transmission and distribution system as a large-capacity static reactive power compensator or an AC-DC power conversion device for high-voltage DC power transmission. The converter cell includes a plurality of switching elements and a power storage element, and is configured of a chopper circuit, a bridge circuit, or the like.

A method for dividing a plurality of converter cells in an arm into two cell groups is known in the MMC converter. For example, in Japanese Patent No. 6509352 (PTL 1), an AC-DC conversion operation is performed by one cell group, and a circulating current is controlled by the other cell group.

CITATION LIST

Patent Literature

PTL 1: Japanese Patent No. 6509352

SUMMARY OF INVENTION

Technical Problem

However, in the method in which the other cell group controls only the circulating current as in PTL 1, when both active power and reactive power output from the power conversion device are small, the voltage at the capacitor included in the other cell group cannot be maintained, and there is a possibility that converter control fails. Accordingly, the voltage at the capacitor included in one cell group and the voltage at the capacitor included in the other cell group are required to be appropriately controlled.

An object of one aspect of the present disclosure is to provide a power conversion device capable of appropriately controlling the voltage at the capacitor included in each cell group even when one cell group and the other cell group perform different operations.

Solution to Problem

According to an embodiment, a power conversion device that performs power conversion between a DC circuit and an AC circuit is provided. The power conversion device includes a power conversion circuit unit including a plurality of leg circuits corresponding to a plurality of phases of an AC circuit. Each of the leg circuits includes a plurality of converter cells each having a capacitor and connected in series to each other. Each of the plurality of converter cells is a first converter cell including at least two switching elements or a second converter cell including at least four switching elements. The power conversion device further includes a control device that controls operations of the plurality of converter cells. The control device operates the plurality of the first converter cells that are controlled not based on a circulating current circulating between the plurality of leg circuits as a voltage source that outputs a circulating voltage in a circulation circuit indicating a closed circuit that does not include a DC circuit and an AC circuit, and operates the plurality of the second converter cells to control the circulating current in the circulation circuit.

Advantageous Effects of Invention

According to the present disclosure, even when one cell group and the other cell group perform different operations, the voltage at the capacitor included in each cell group can be appropriately controlled.

DESCRIPTION OF EMBODIMENTS

Figure 1:
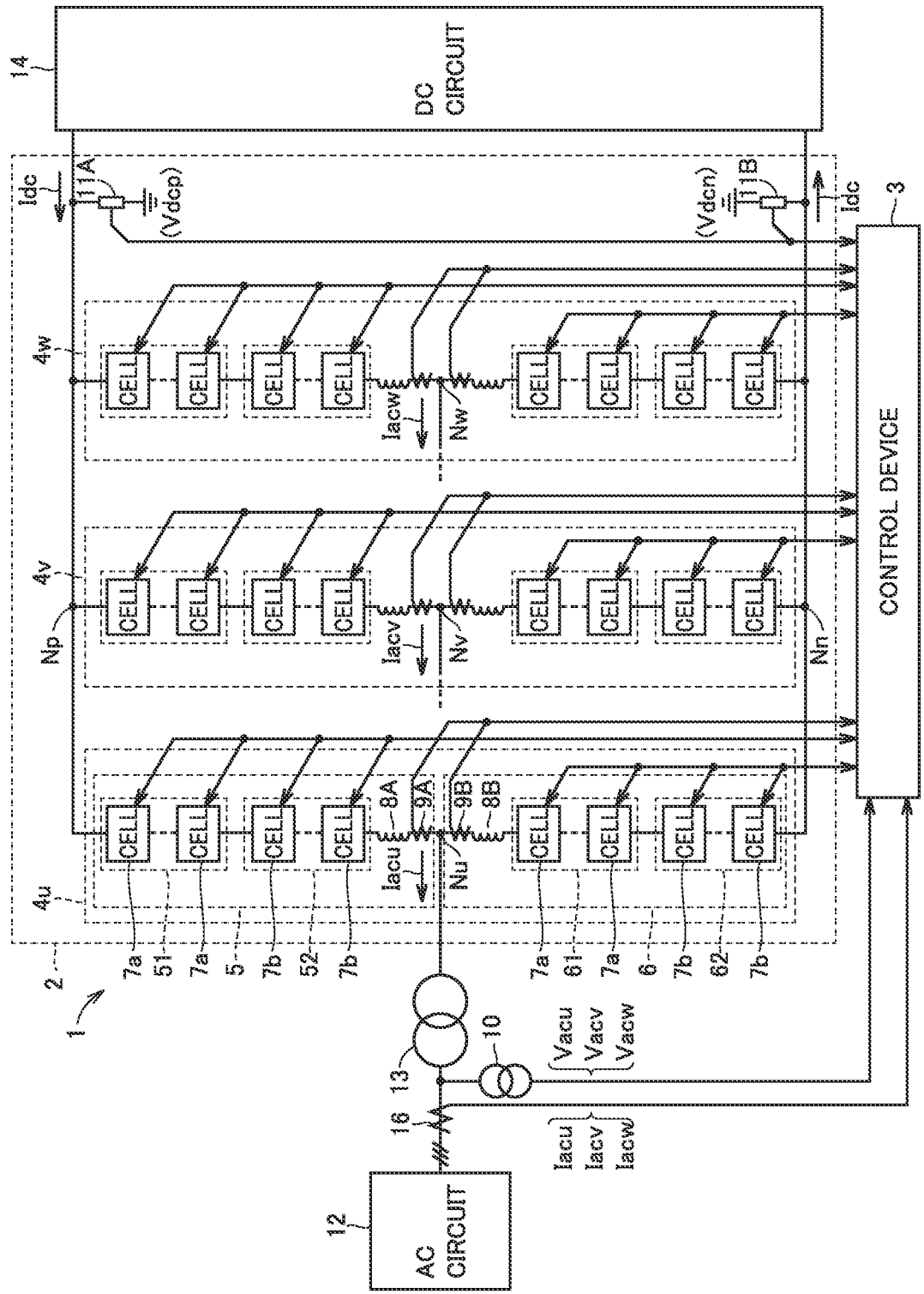
FIG. 1 is a schematic configuration diagram illustrating a power conversion device.

With reference to the drawings, embodiments of the present disclosure will be described below. In the following description, the same component is denoted by the same reference numeral. Those names and functions are the same. Thus, the detailed description thereof will not be repeated.

<Schematic Configuration of Power Conversion Device>

FIG. 1 is a schematic configuration diagram illustrating a power conversion device. With reference to FIG. 1, a power conversion device 1 is configured of a modular multilevel converter including a plurality of converter cells (corresponding to "cell" in FIG. 1) connected in series to each other. Power conversion device 1 performs power conversion between a DC circuit 14 and an AC circuit 12. Power conversion device 1 includes a power conversion circuit unit 2 and a control device 3.

Power conversion circuit unit 2 includes a plurality of leg circuits $4u$, $4v$, $4w$ (hereinafter, also collectively referred to as "leg circuits 4") connected in parallel to each other between a positive-side DC terminal (that is, a high-potential-side DC terminal) Np and a negative-side DC terminal (that is, a low-potential-side DC terminal) Nn.

Leg circuit 4 is provided in each of a plurality of phases constituting an AC current. Leg circuit 4 is connected between AC circuit 12 and DC circuit 14, and performs the power conversion between both the circuits. FIG. 1 illustrates a case where AC circuit 12 is a three-phase AC system, and three leg circuits $4u$, $4v$, $4w$ are provided corresponding to a U-phase, a V-phase, and a W-phase, respectively.

AC terminals Nu, Nv, Nw provided in leg circuits $4u$, $4v$, $4w$ are connected to AC circuit 12 through a transformer 13. For example, AC circuit 12 is an AC power system including an AC power supply and the like. In FIG. 1, connection between AC terminals Nv, Nw and transformer 13 is not illustrated for ease of illustration.

A positive-side DC terminal Np and a negative-side DC terminal Nn that are commonly connected to each leg circuit 4 are connected to DC circuit 14. For example, DC circuit 14 is a DC terminal of a DC power system including a DC power supply network or the like or another power conversion device. In the latter case, a back to back (BTB) system connecting AC power systems having different rated frequencies or the like is configured by coupling two power conversion devices.

Instead of use of transformer 13 in FIG. 1, power conversion device 1 may be connected to AC circuit 12 through an interconnection reactor. A primary winding may be provided in each of leg circuits 4u, 4v, 4w instead of AC terminals Nu, Nv, Nw, and leg circuits 4u, 4v, 4w may be connected to transformer 13 or the interconnection reactor in terms of AC through a secondary winding magnetically coupled to the primary winding. In this case, the primary winding may be set to following reactors 8A, 8B. That is, leg circuit 4 is electrically (that is, in terms of DC or AC) connected to AC circuit 12 through a connection portion provided in each of leg circuits 4u, 4v, 4w, such as AC terminals Nu, Nv, Nw or the primary winding.

Leg circuit 4u includes two arms connected in series. Specifically, leg circuit 4u includes a positive-side arm 5 from positive-side DC terminal Np to AC terminal Nu and a negative-side arm 6 from negative-side DC terminal Nn to AC terminal Nu. The positive-side arm is also referred to as an upper arm, and the negative-side arm is also referred to as a lower arm. AC terminal Nu that is a connection point between positive-side arm 5 and negative-side arm 6 is connected to transformer 13. Positive-side DC terminal Np and negative-side DC terminal Nn are connected to DC circuit 14. Hereinafter, leg circuit 4u will be described below as a representative because leg circuits 4v, 4w have the same configuration.

Positive-side arm 5 includes a cell group 51 in which a plurality of converter cells 7a are cascade-connected, a cell group 52 in which a plurality of converter cells 7b are cascade-connected, and reactor 8A. Cell group 51, cell group 52, and reactor 8A are connected in series to each other. Negative-side arm 6 includes a cell group 61 in which the plurality of converter cells 7a are cascade-connected, a cell group 62 in which the plurality of converter cells 7b are cascade-connected, and reactor 8B. Cell group 61, cell group 62, and reactor 8B are connected in series to each other.

In the following description, the number of converter cells 7a included in each of cell group 51 and cell group 61 is set to N1. Where, N1≥2. The number of converter cells 7b included in each of cell group 52 and cell group 62 is set to N2. Where, N2≥1. In the following description, sometimes converter cells 7a and 7b are collectively referred to as a converter cell 7. For ease of illustration, the plurality of converter cells 7a are disposed adjacent to each other and the plurality of converter cells 7b are disposed adjacent to each other in each arm, but limitation to the configuration is not intended. The plurality of converter cells 7a may be disposed in a dispersed manner, and the plurality of converter cells 7b may be disposed in a dispersed manner. Each of the plurality of converter cells 7 included in each leg circuit 4 is converter cell 7a or converter cell 7b.

A position where reactor 8A is inserted may be any position of positive-side arm 5 of leg circuit 4u, and a position where reactor 8B is inserted may be any position of negative-side arm 6 of leg circuit 4u. A plurality of reactors 8A and a plurality of reactors 8B may be provided. Inductance values of the reactors may be different from each other. Only reactor 8A of positive-side arm 5 or only reactor 8B of negative-side arm 6 may be provided.

Although details will be described later, cell groups 51, 61 and the cell groups 52, 62 have different roles. Specifically, converter cell 7a of cell groups 51, 61 is not used for controlling the circulating current, but is in charge of controlling (that is, AC-DC conversion control) an AC electric quantity and a DC electric quantity, and converter cell 7b of cell groups 52, 62 is mainly in charge of controlling the circulating current.

Power conversion device 1 includes an AC voltage detector 10, an AC current detector 16, DC voltage detectors 11A, 11B, and arm current detectors 9A, 9B provided in each leg circuit 4 as detectors that measure an electric quantity of (for example, current and voltage) used for control. Signals detected by these detectors are input to control device 3.

In FIG. 1, for ease of illustration, a signal line of the signal input from each detector to control device 3 and a signal line of the signal input and output between control device 3 and each converter cell 7 are partially collectively illustrated, but are actually provided for each detector and each converter cell 7. The signal line between each converter cell 7 and control device 3 may be provided separately for transmission and for reception. For example, the signal line is formed of an optical fiber.

AC voltage detector 10 detects a U-phase AC voltage Vacu, a V-phase AC voltage Vacv, and a W-phase AC voltage Vacw of AC circuit 12. AC current detector 16 detects a U-phase AC current Iacu, a V-phase AC current Iacv, and a W-phase AC current Iacw of AC circuit 12. DC voltage detector 11A detects a DC voltage Vdcp of positive-side DC terminal Np connected to DC circuit 14. DC voltage detector 11B detects a DC voltage Vdcn of negative-side DC terminal Nn connected to DC circuit 14.

Arm current detectors 9A, 9B provided in U-phase leg circuit 4u detect a positive-side arm current Ipu flowing through positive-side arm 5 and a negative-side arm current Inu flowing through negative-side arm 6. Arm current detectors 9A, 9B provided in V-phase leg circuit 4v detect a positive-side arm current Ipv and a negative-side arm current Inv. Arm current detectors 9A, 9B provided in W-phase leg circuit 4w detect a positive-side arm current Ipw and a negative-side arm current Inw. In the following description, positive-side arm currents Ipu, Ipv, Ipw are collectively referred to as a positive-side arm current Iarmp, negative-side arm currents Inu, Inv, Inw are collectively referred to as a negative-side arm current Iarmn, and positive-side arm current Iarmp and negative-side arm current Iarmn are collectively referred to as an arm current Iarm. In arm current Iarm, a current flowing from positive-side DC terminal Np toward negative-side DC terminal Nn is set to positive.

Control device 3 may be configured of a dedicated circuit, and a part or all of the dedicated circuit may be configured of a field programmable gate array (FPGA), a microprocessor, or the like. Typically, control device 3 includes an auxiliary transformer, an analog to digital (AD) converter, an arithmetic unit, and the like as a hardware configuration. The arithmetic unit includes a central processing unit (CPU), a random access memory (RAM), and a read only memory (ROM). The AD converter includes an analog filter, a sample hold circuit, and a multiplexer. For example, control device 3 may be configured of a digital protection control device.

<Configuration Example of Converter Cell>

Figure 2:
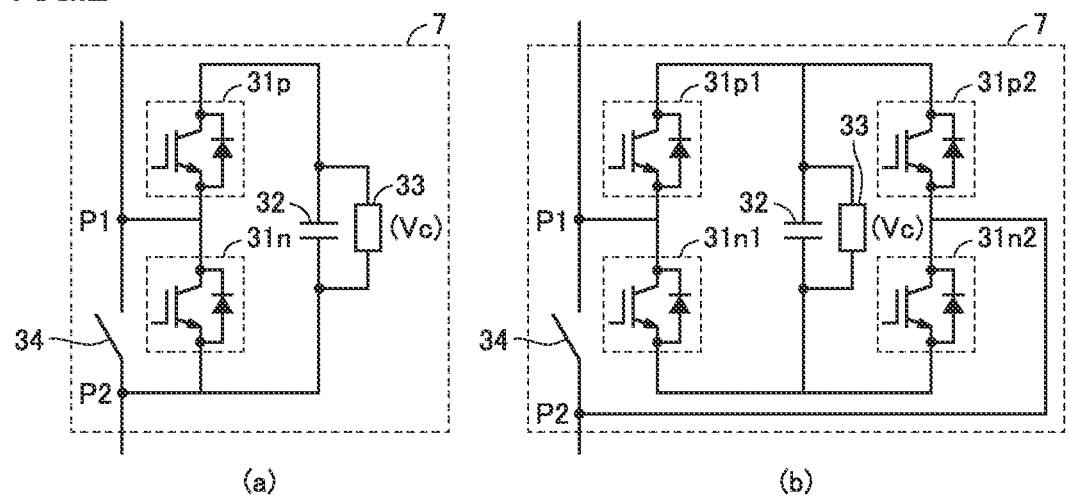
FIG. 2 is a circuit diagram illustrating an example of a converter cell constituting a cell group.

FIG. 2 is a circuit diagram illustrating an example of the converter cell constituting the cell group. Converter cell 7 in FIG. 2(a) has a circuit configuration called a half-bridge configuration. Converter cell 7 includes a series body formed by connecting two switching elements 31p, 31n in series, a capacitor 32 as an energy accumulator, a bypass switch 34, and a voltage detector 33. The series body and capacitor 32 are connected in parallel. Voltage detector 33 detects a capacitor voltage Vc that is the voltage at both ends of capacitor 32.

Converter cell 7 in FIG. 2(b) has a circuit configuration called a full-bridge configuration. Converter cell 7 includes a first series body formed by connecting two switching elements 31p1, 31n1 in series, a second series body formed by connecting two switching elements 31p2, 31n2 in series, capacitor 32, bypass switch 34, and voltage detector 33. The first series body, the second series body, and capacitor 32 are connected in parallel. Voltage detector 33 detects capacitor voltage Vc.

Two switching elements 31p, 31n in FIG. 2(a) and four switching elements 31p1, 31n1, 31p2, 31n2 in FIG. 2(b) are configured such that a freewheeling diode (FWD) is connected in antiparallel to a self-arc-extinguishing semiconductor switching element such as an insulated gate bipolar transistor (IGBT), a gate commutated turn-off (GCT) thyristor, or a metal oxide semiconductor field effect transistor (MOSFET). In FIGS. 2(a) and 2(b), a capacitor such as a film capacitor is mainly used as capacitor 32.

In the following description, switching elements 31p, 31n, 31p1, 31n1, 31p2, 31n2 are also collectively referred to as a switching element 31. In addition, on and off of the semiconductor switching element in switching element 31 will be simply referred to as "on and off of switching element 31".

With reference to FIG. 2(a), both terminals of switching element 31n are referred to as input and output terminals P1, P2. Voltage across capacitor 32 and zero voltage are output by switching operations of switching elements 31p, 31n. For example, when switching element 31p is turned on and when switching element 31n is turned off, the voltage across capacitor 32 is output. When switching element 31p is turned off and when switching element 31n is turned on, zero voltage is output. In FIG. 2(a), both terminals of switching element 31n are set as input and output terminals P1, P2, but both terminals of switching element 31p may be set as input and output terminals P1, P2, and in this case, the operation is reversed.

Bypass switch 34 is connected between input and output terminals P1, P2. In FIG. 2(a), bypass switch 34 is connected in parallel to switching element 31n. However, when both terminals of switching element 31p are input and output terminals P1, P2, bypass switch 34 is connected in parallel to switching element 31p. Converter cell 7 is short-circuited by turning on bypass switch 34.

With reference to FIG. 2(b), a midpoint between switching element 31p1 and switching element 31n1 and a midpoint between switching element 31p2 and switching element 31n2 are set to input and output terminals P1, P2 of converter cell 7. Converter cell 7 in FIG. 2(b) outputs positive voltage or zero voltage by constantly turning on switching element 31n2, constantly turning off switching element 31p2, and alternately turning on switching elements 31p1, 31n1. In addition, converter cell 7 in FIG. 2(b) can output zero voltage or negative voltage by constantly turning off switching element 31n2, constantly turning on switching element 31p2, and alternately turning on switching elements 31p1, 31n1.

Bypass switch 34 is connected between input and output terminals P1, P2. Bypass switch 34 is connected in parallel to the series body of switching elements 31n1, 31n2. Converter cell 7 is short-circuited by turning on bypass switch 34.

In the following description, the case where converter cells 7a, 7b are configured as a half-bridge cell in FIG. 2(a) and the semiconductor switching element and the capacitor as the energy accumulation element are used will be described as an example. However, converter cells 7a, 7b may have a full-bridge configuration in FIG. (b). A converter cell other than the configuration described above, for example, a converter cell to which a circuit configuration called a clamped double cell or the like is applied may be used, and the switching element and the energy accumulation element are not limited to those described above.

<Configuration of Control Device 3>

Figure 3:
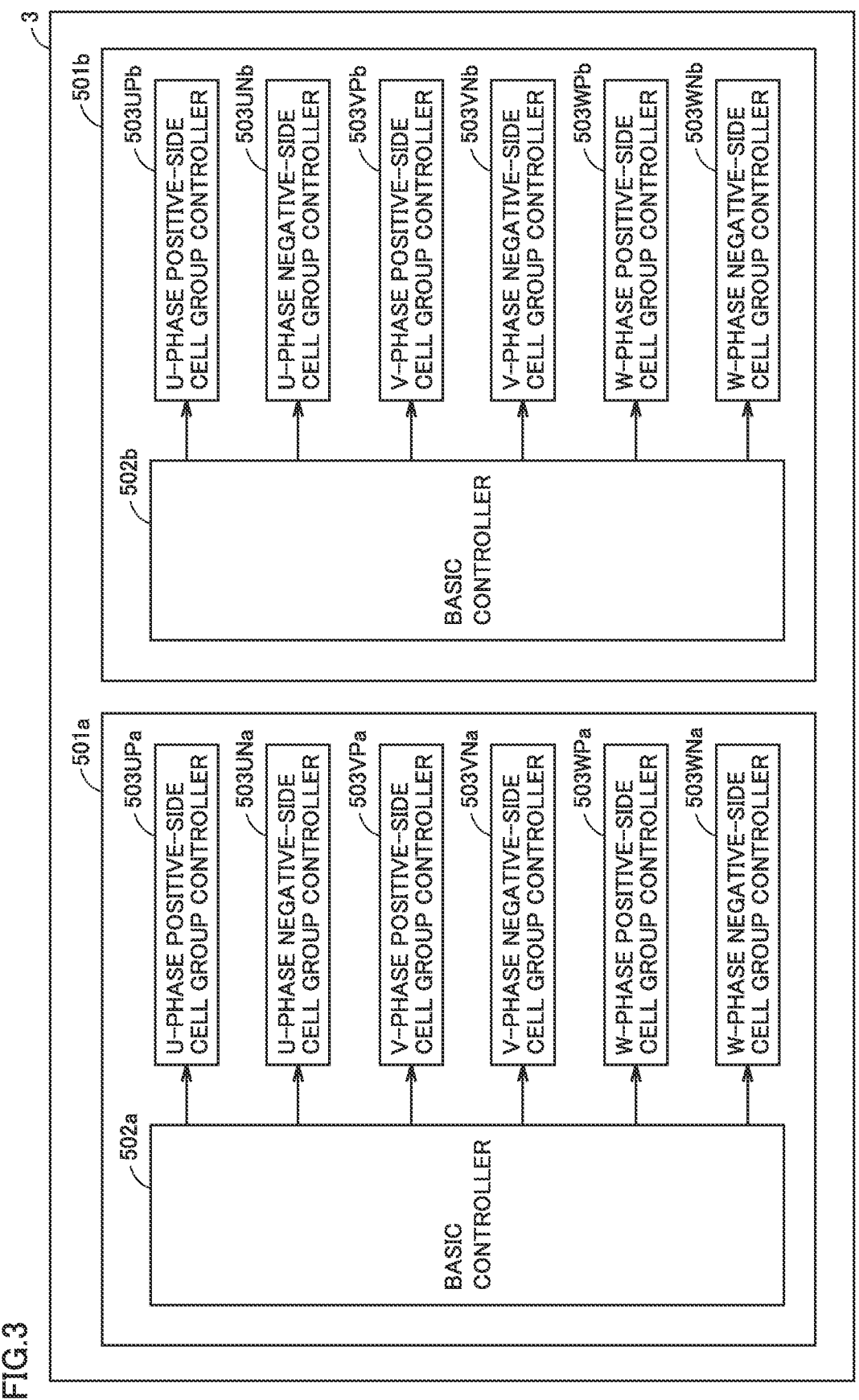
FIG. 3 is a view illustrating an internal configuration of a control device.

FIG. 3 is a view illustrating an internal configuration of control device 3. With reference to FIG. 3, control device 3 includes switching controllers 501a, 501b (hereinafter, also collectively referred to as a "switching controller 501"). Switching controller 501a controls on and off of each switching element 31 of converter cell 7a. Switching controller 501b controls on and off of each switching element 31 of converter cell 7b.

Switching controller 501a includes a basic controller 502a, a U-phase positive-side cell group controller 503UPa, a U-phase negative-side cell group controller 503UNa, a V-phase positive-side cell group controller 503VPa, a V-phase negative-side cell group controller 503VNa, a W-phase positive-side cell group controller 503WPa, and a W-phase negative-side cell group controller 503WNa. Switching controller 501b includes a basic controller 502b, a U-phase positive-side cell group controller 503UPb, a U-phase negative-side cell group controller 503UNb, a V-phase positive-side cell group controller 503VPb, a V-phase negative-side cell group controller 503VNb, a W-phase positive-side cell group controller 503WPb, and a W-phase negative-side cell group controller 503WNb.

In the following description, U-phase positive-side cell group controller 503UPa, V-phase positive-side cell group controller 503VPa, and W-phase positive-side cell group controller 503WPa are also collectively referred to as a positive-side cell group controller 503Pa. U-phase negative-side cell group controller 503UNa, V-phase negative-side cell group controller 503VNa, and W-phase negative-side cell group controller 503WNa are also collectively referred to as a negative-side cell group controller 503Na. Positive-side cell group controller 503Pa and negative-side cell group controller 503Na are also collectively referred to as a cell group controller 503a. Positive-side cell group controller 503Pa controls the operation of cell group 51, and negative-side cell group controller 503Na controls the operation of cell group 61.

U-phase positive-side cell group controller 503UPb, V-phase positive-side cell group controller 503VPb, and W-phase positive-side cell group controller 503WPb are also collectively referred to as a positive-side cell group controller 503Pb. U-phase negative-side cell group controller 503UNb, V-phase negative-side cell group controller 503VNb, and W-phase negative-side cell group controller 503WNb are also collectively referred to as a negative-side cell group controller 503Nb. Positive-side cell group controller 503Pb and negative-side cell group controller 503Nb are also collectively referred to as a cell group controller 503b. Positive-side cell group controller 503Pb controls the operation of cell group 52, and negative-side cell group controller 503Nb controls the operation of cell group 62.

Furthermore, basic controller 502a and basic controller 502b are also collectively referred to as a basic controller 502, and cell group controller 503a and cell group controller 503b are also collectively referred to as a cell group controller 503.

Figure 4:
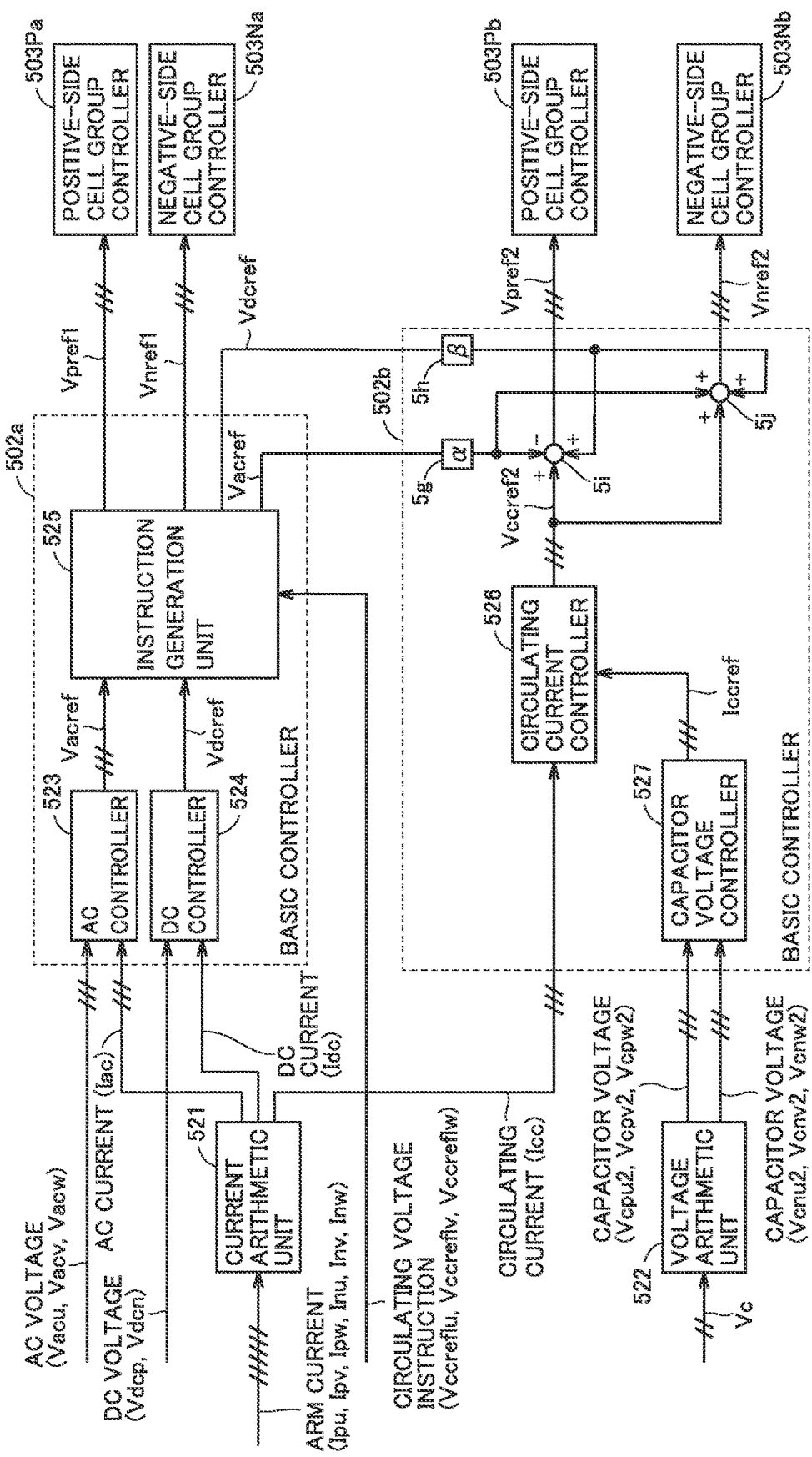
FIG. 4 is a view illustrating a configuration of a basic controller.

FIG. 4 is a view illustrating a configuration of basic controller 502. With reference to FIG. 4, control device 3 includes basic controllers 502a, 502b, a current arithmetic unit 521, a voltage arithmetic unit 522, positive-side cell group controllers 503Pa, 503Pb, and negative-side cell group controllers 503Na, 503Nb. Basic controller 502a includes an AC controller 523, a DC controller 524, and an instruction generation unit 525. Basic controller 502b includes a circulating current controller 526, a capacitor voltage controller 527, an adder-subtractor 5i, an adders 5j, and gain circuits 5g, 5h.

Basic controller 502a supplies later-described voltage instruction values Vpref1, Vnref1 to positive-side cell group controller 503Pa and negative-side cell group controller 503Na, respectively. Basic controller 502b supplies later-described voltage instruction values Vpref2, Vnref2 to positive-side cell group controller 503Pb and negative-side cell group controller 503Nb, respectively.

Voltage instruction values Vpref1, Vnref1 supplied to positive-side cell group controller 503Pa and negative-side cell group controller 503Na for controlling AC-DC conversion are not based on a detection value of a circulating current Icc. Voltage instruction values Vpref2, Vnref2 supplied to the positive-side cell group controller 503Pb and negative-side cell group controller 503Nb for controlling the circulating current are based on the detection value of circulating current Icc. From this, it can be said that converter cells 7a of cell groups 51, 61 are controlled not based on the circulating current, and converter cells 7b of cell groups 52, 62 are controlled based on the circulating current.

Current arithmetic unit 521 takes in the positive-side arm currents Ipu, Ipv, Ipw detected by arm current detector 9A and the negative-side arm currents Inu, Inv, Inw detected by arm current detector 9B. Current arithmetic unit 521 operates AC currents Iacu, Iacv, Iacw (hereinafter, also collectively referred to as an "AC current Iac"), a DC current Idc, and circulating currents Iccu, Iccv, Iccw (hereinafter, also collectively referred to as a "circulating current Icc") from the taken arm current. Current arithmetic unit 521 outputs each AC current Iac to AC controller 523, outputs DC current Idc to DC controller 524, and outputs circulating current Icc to circulating current controller 526.

U-phase AC current Iacu, V-phase AC current Iacv, and W-phase AC current Iacw are defined such that a current flowing from AC terminals Nu, Nv, Nw of each leg circuit 4 toward transformer 13 is set to positive. DC current Idc is defined such that a direction from DC circuit 14 toward positive-side DC terminal Np and a direction from negative-side DC terminal Nn toward DC circuit 14 are set to positive. Circulating currents Iccu, Iccv, Iccw flowing through leg circuits 4u, 4v, 4w are defined such that the direction from positive-side DC terminal Np toward negative-side DC terminal Nn is set to positive.

U-phase, V-phase, W-phase AC voltages Vacu, Vacv, Vacw (hereinafter, also collectively referred to as an "AC voltage Vac") detected by AC voltage detector 10 are further input to AC controller 523. AC controller 523 generates U-phase, V-phase, W-phase AC voltage instruction values Vacrefu, Vacrefv, Vacrefw (hereinafter, also collectively referred to as an "AC voltage instruction value Vacref") as instruction values of the AC voltage output from power conversion device 1 to AC circuit 12 based on AC current Iac and AC voltage Vac.

DC voltages Vdcp, Vdcn detected by DC voltage detectors 11A, 11B are further input to DC controller 524. DC controller 524 generates a DC voltage instruction value Vdcref as an instruction value of the DC voltage output from power conversion device 1 to DC circuit 14 based on DC voltage (that is, the voltage between the DC terminals) Vdc and DC current Idc of DC circuit 14 calculated from DC voltages Vdcp, Vdcn.

In this case, instruction generation unit 525 generates voltage instruction values Vpref1$u$, Vnref1$u$ used for U-phase cell groups 51, 61 based on U-phase AC voltage instruction value Vacrefu, DC voltage instruction value Vdcref, and U-phase circulating voltage instruction value Vccref1$u$. Instruction generation unit 525 generates voltage instruction values Vpref1$v$, Vnref1$v$ used for V-phase cell groups 51, 61 based on V-phase AC voltage instruction value Vacrefv, DC voltage instruction value Vdcref, and V-phase circulating voltage instruction value Vccref1$v$. Instruction generation unit 525 generates voltage instruction values Vpref1$w$, Vnref1$w$ used for W-phase cell groups 51, 61 based on W-phase AC voltage instruction value Vacrefw, DC voltage instruction value Vdcref, and W-phase circulating voltage instruction value Vccref1$w$. Hereinafter, circulating voltage instruction values Vccref1$u$, Vccref1$v$, Vccref1$w$ are also collectively referred to as a circulating voltage instruction value Vccref1.

Voltage instruction values Vpref1$u$, Vpref1$v$, Vpref1$w$ (also collectively referred to as a "voltage instruction value Vpref1") are supplied to positive-side cell group controller 503Pa. Voltage instruction values Vnref1$u$, Vnref1$v$, Vnref1$w$ (also collectively referred to as a "voltage instruction value Vnref1") are supplied to negative-side cell group controller 503Na.

Voltage arithmetic unit 522 receives information about capacitor voltage Vc from each converter cell 7b provided in cell groups 52, 62 of each leg circuit 4. Voltage arithmetic unit 522 calculates a representative value Vcp2 of the plurality of capacitor voltages of cell group 52 and calculates a representative value Vcn2 of the plurality of capacitor voltages of cell group 62 for each phase based on the information about each capacitor voltage Vc. Representative values Vcp2 of the U phase, the V phase, and the W phase are described as Vcpu2, Vcpv2, and Vcpw2, respectively, and representative values Vcn2 of the U phase, the V phase, and the W phase are described as Vcnu2, Vcnv2, and Vcnw2, respectively.

An average value, a median value, a maximum value, a minimum value, or the like of capacitor voltage Vc of each cell group can be appropriately applied for the arithmetic operation of the representative value. Voltage arithmetic unit 522 outputs representative values Vcpu2, Vcpv2, Vcpw2 of the capacitor voltages of the respective cell groups 52 and representative values Vcnu2, Vcnv2, Vcnw2 of the capacitor voltages of the respective cell groups 62 to capacitor voltage controller 527.

Capacitor voltage controller 527 receives information about capacitor voltages Vcpu2, Vcpv2, Vcpw2, Vcnu2, Vcnv2, Vcnw2 from voltage arithmetic unit 522. Capacitor voltage controller 527 generates a circulating current instruction value Iccpref for cell group 52 based on capacitor voltages Vcpu2, Vcpv2, Vcpw2, and outputs generated circulating current instruction value Iccpref to circulating current controller 526. Capacitor voltage controller 527 generates a circulating current instruction value Iccnref for cell group 62 based on capacitor voltages Vcnu2, Vcnv2, Vcnw2, and outputs generated circulating current instruction value Iccnref to circulating current controller 526. Circulating current instruction values Iccpref, Iccnref are also collectively referred to as a circulating current instruction value Iccref.

Circulating current controller 526 generates circulating voltage instruction values Vccref2u, Vccref2v, Vccref2w (hereinafter, also collectively referred to as a "circulating voltage instruction value Vccref2") for the U-phase, the V-phase, and the W-phase based on circulating currents Iccu, Iccv, Iccw and circulating current instruction value Iccref.

Adder-subtractor 5i adds or subtracts circulating voltage instruction value Vccref2, a value obtained by multiplying AC voltage instruction value Vacref by gain $\alpha$ (where $0 \le \alpha < 1$) in gain circuit 5g, and a value obtained by multiplying DC voltage instruction value Vdcref by $\beta$ times (where $0 \le \beta < 1$) in gain circuit 5h for each phase.

As a result, a voltage instruction value Vpref2 for cell group 52 is generated, and generated voltage instruction value Vnref2 is supplied to positive-side cell group controller 503Pb.

Adder 5j adds circulating voltage instruction value Vccref2, a value obtained by multiplying AC voltage instruction value Vacref by gain $\alpha$, and a value obtained by multiplying DC voltage instruction value Vdcref by $\beta$ times for each phase. As a result, a voltage instruction value Vnref2 for cell group 62 is generated, and generated voltage instruction value Vnref2 is supplied to negative-side cell group controller 503Nb.

As described above, basic controller 502a generates voltage instruction values Vpref1, Vnref1 in order to control the output voltages of the plurality of converter cells 7a for each leg circuit 4 based on DC current Idc and DC voltage Vdc of DC circuit 14, AC current Iac and AC voltage Vac of each phase of AC circuit 12, and circulating voltage instruction value Vccref1. Basic controller 502b linearly combines circulating voltage instruction value Vccref2 based on the deviation between circulating current Icc and circulating current instruction value Iccref, AC voltage instruction value Vacref, and DC voltage instruction value Vdcref to generate voltage instruction values Vpref2, Vnref2 for controlling the output voltages of the plurality of converter cells 7b.

<Detailed Operation of Control Device 3>
(Operation of Current Arithmetic Unit)

With reference to FIG. 1, the connection point between positive-side arm 5 and negative-side arm 6 of U-phase leg circuit 4u is AC terminal Nu, and AC terminal Nu is connected to transformer 13. Accordingly, AC current Iacu flowing from AC terminal Nu toward transformer 13 is a current value obtained by subtracting negative-side arm current Inu from positive-side arm current Ipu as in the following Equation (1).

$$Iacu = Ipu - Inu \tag{1}$$

Assuming that the average value of positive-side arm current Ipu and negative-side arm current Inu is a common current flowing through positive-side arm 5 and negative-side arm 6, this current is a leg current Icomu flowing through the DC terminal of leg circuit 4u. Leg current Icomu is expressed by the following Equation (2).

$$Icomu = (Ipu + Inu)/2 \tag{2}$$

Also in the V phase, AC current Iacv and a leg current Icomv are calculated using positive-side arm current Ipv and negative-side arm current Inv, and also in the W phase, AC current Iacw and a leg current Icomw are calculated using positive-side arm current Ipw and negative-side arm current Inw. Specifically, they are represented by the following Equations (3) to (6).

$$IacV = Ipv - Inv \tag{3}$$

$$Icomv = (Ipv + Inv)/2 \tag{4}$$

$$Iacw = Ipw - Inw \tag{5}$$

$$Icomw = (Ipw + Inw)/2 \tag{6}$$

The positive-side DC terminals of leg circuits 4u, 4v, 4w of the respective phases are commonly connected as positive-side DC terminal Np, and the negative-side DC terminals are commonly connected as negative-side DC terminal Nn. From this configuration, the current value obtained by adding leg currents Icomu, Icomv, Icomw of the respective phases becomes DC current Idc that flows in from the positive-side terminal of DC circuit 14 and feeds back to DC circuit 14 through the negative-side terminal. Accordingly, DC current Idc is expressed as the following Equation (7).

$$Idc = Icomu + Icomv + Icomw \tag{7}$$

When the DC current components included in the leg current are equally shared by the respective phases, the current capacity of the converter cell can be equalized. With this taken into consideration, the difference between the leg current and ⅓ of the DC current value can be operated as the current value of the circulating current that does not flow through DC circuit 14 but flows between the legs of each phase. Consequently, circulation currents Iccu, Iccv, Iccw of the U phase, the V phase, and the W phase are expressed as the following Equations (8), (9), (10).

$$Iccu = Icomu - Idc/3 \tag{8}$$

$$Iccv = Icomv - Idc/3 \tag{9}$$

$$Iccw = Icomw - Idc/3 \tag{10}$$

Current arithmetic unit 521 in FIG. 4 operates AC currents Iacu, Iacv, Iacw, the DC current Idc, and the circulation currents Iccu, Iccv, Iccw from positive-side arm currents Ipu, Ipv, Ipw and negative-side arm currents Inu, Inv, Inw according to the above equation.

(Operation of AC Controller 523)

From AC voltages Vacu, Vacv, Vacw detected by AC voltage detector 10 and AC currents Iacu, Iacv, Iacw output from current arithmetic unit 521, AC controller 523 outputs the AC voltages to be output from converter cells 7 constituting power conversion device 1 as AC voltage instruction values Vacrefu, Vacrefv, Vacrefw.

For example, AC controller 523 is configured of an AC current controller that performs feedback control such that the AC current value is matched with the AC current instruction value, an AC voltage controller that performs feedback control such that the AC voltage value is matched with the AC voltage instruction value, and the like according to a function required for power conversion device 1. Alternatively, AC controller 523 may be configured of a power controller that obtains power from the AC current value and the AC voltage value and performs feedback control such that the power value becomes a desired value. In practice, one or a plurality of the AC current controllers, the AC voltage controllers, and the power controllers are combined to configure and operate AC controller 523.

In the embodiment, AC voltage instruction value Vacref generated by AC controller 523 includes an AC voltage instruction value Vacref1 for cell groups 51, 61 and an AC voltage instruction value Vacref2 for cell groups 52, 62. A ratio between AC voltage instruction value Vacref1 and AC voltage instruction value Vacref2 is $(1-\alpha):\alpha$. That is, Vacref1=$(1-\alpha)\times$Vacref, and Vacref2=$\alpha\times$Vacref. For this reason, voltage instruction values Vpref1, Vnref1 for cell groups 51, 61 include AC voltage instruction value Vacref1, and voltage instruction values Vpref2, Vnref2 for cell groups 52, 62 include AC voltage instruction value Vacref2.

Because the AC current controller described above controls the current output to AC circuit 12 through transformer 13, the voltage component controlling the current is a positive phase component and a reversed phase component of the multi-phase AC voltage or a component known as a normal mode component. Similarly, the AC voltage controller outputs the positive phase component and the reversed phase component to AC circuit 12 through transformer 13.

When the three-phase AC voltage is output to AC circuit 12, it is also conceivable to output a voltage component common to the three phases, which are known as a zero-phase component or a common mode component, to AC circuit 12 in addition to these positive and negative phase components. For example, when a third harmonic wave having a frequency three times the fundamental wave frequency is superimposed on the zero-phase component, it is known that the fundamental wave AC component that can be output by converter cell 7 can be increased by about 15%.

Furthermore, by outputting a constant zero-phase component, the following effects can be obtained. In power conversion device 1 having the configuration in FIG. 1, the AC voltage component output from cell group 51 and the AC voltage component output from cell group 61 have opposite polarities, and the DC voltage component output from cell group 51 and the DC voltage component output from cell group 61 have the same polarity. Accordingly, when a certain zero-phase component is included in the AC voltage component, the zero-phase component is superimposed on the DC voltage component output from cell group 51 and the DC voltage component output from cell group 61 in the positive and negative opposite directions. As a result, because the difference is generated between the DC power output from cell group 51 and the DC power output from cell group 61, the energy accumulated in capacitor 32 included in each converter cell 7 can be exchanged between cell group 51 and cell group 61. Thus, the voltage value of capacitor 32 of each converter cell 7 constituting cell group 51 and the voltage value of capacitor 32 of converter cell 7 constituting cell group 61 can be balanced, and the zero-phase voltage can be used for such balance control.

(Operation of DC Controller 524)

DC controller 524 operates a DC inter-terminal voltage Vdc from the difference voltage between DC voltages Vdcp, Vdcn detected by DC voltage detectors 11A, 11B, and is expressed as the following Equation (11).

$$Vdc = Vdcp - Vdcn \qquad (11)$$

DC controller 524 generates and outputs the DC voltage that should be output by converter cell 7 as DC voltage instruction value Vdcref from DC inter-terminal voltage Vdc and DC current Idc. For example, DC controller 524 is configured by combining any one or a plurality of the DC current controllers that control the DC current, the DC voltage controllers that control the DC voltage, and the DC power controllers that control the DC power.

In the embodiment, DC voltage instruction value Vdcref output from the DC voltage controller, the DC current controller, and the DC power controller includes a DC voltage instruction value Vdcref1 for cell groups 51, 61 and a DC voltage instruction value Vdcref2 for cell groups 52, 62. A ratio between DC voltage instruction value Vdcref1 and DC voltage instruction value Vdcref2 is $(1-\beta):\beta$. That is, Vdcref1=$(1-\beta)\times$Vdcref, and Vdcref2=$\beta\times$Vdcref. For this reason, voltage instruction values Vpref1, Vnref1 for cell groups 51, 61 include DC voltage instruction value Vdcref1, and voltage instruction values Vpref2, Vnref2 for cell groups 52, 62 include DC voltage instruction value Vdcref2.

According to DC voltage instruction value Vdcref1, the DC voltage component output from cell group 51 and the DC voltage component output from cell group 61 have the same polarity, and according to DC voltage instruction value Vdcref2, the DC voltage component output from cell group 52 and the DC voltage component output from cell group 62 have the same polarity. Because cell groups 51, 52, 61, 62 are connected in series, the output voltages of cell groups 51, 52, 61, 62 are combined, and the combined voltage becomes a voltage component generated between the positive-side DC terminal and the negative-side DC terminal of leg circuit 4. DC voltage instruction value Vdcref1 is given to positive-side cell group controller 503Pa and negative-side cell group controller 503Na as components common to the respective phases, and DC voltage instruction value Vdcref2 is given to positive-side cell group controller 503Pb and negative-side cell group controller 503Nb as components common to the respective phases. Consequently, according to DC voltage instruction value Vdcref, the voltage components output from cell groups 51, 52, 61, 62 become DC voltage components output to DC circuit 14.

(Operation of Instruction Generation Unit 525)

Instruction generation unit 525 operates the voltage to be output from cell group 51 as voltage instruction value Vpref1, and operates the voltage to be output from cell group 61 as voltage instruction value Vnref1. Each of voltage instruction values Vpref1, Vnref1 is obtained by combining DC voltage instruction value Vdcref, AC voltage instruction value Vacref, and circulating voltage instruction value Vccref1 for each phase.

Specifically, cell group 51, cell group 61, cell group 52, and cell group 62 are connected in series between positive-side DC terminal Np and negative-side DC terminal Nn that are connected to DC circuit 14. As described above, DC voltage instruction value Vdcref includes DC voltage instruction value Vdcref1 for cell groups 51, 61 and DC voltage instruction value Vdcref2 for cell groups 52, 62. Accordingly, when each of voltage instruction value Vpref1 of cell group 51 and voltage instruction value Vnref1 of cell group 61 is calculated, $(1-\beta)$ times DC voltage instruction value Vdcref is added and combined.

AC voltage instruction value Vacref includes an AC voltage instruction value Vacref1 for cell groups 51, 61 and an AC voltage instruction value Vacref2 for cell groups 52, 62. Because each of AC terminals Nu, Nv, Nw are located at the connection point between positive-side arm 5 and the negative-side arm 6, $(1-a)$ times AC voltage instruction value Vacref is subtracted and combined when voltage instruction value Vpref1 of cell group 51 is calculated, and $(1-a)$ times AC voltage instruction value Vacref is added and combined when voltage instruction value Vnref1 of cell group 61 is calculated.

In addition, when each of voltage instruction value Vpref1 of cell group 51 and voltage instruction value Vnref1 of cell group 61 is calculated, circulating voltage instruction value Vccref1 is added and combined. The sum of circulating voltage instruction values Vccref1u, Vccref1v, Vccref1w of the respective phases is set to zero voltage. Specifically, voltage instruction values Vpref1u, Vpref1v, Vpref1w, Vnref1u, Vnref1v, Vnref1w are expressed as the following Equations (12) to (17). Furthermore, zero-phase potential Vn is expressed by the following Equation (18), and the following Equation (19) holds for the circulating voltage instruction value.

$$\text{Vpref1}u = (1-\beta)\text{Vdcref} - (1-\alpha)\text{Vacrefu} + \text{Vccref1}u \quad (12)$$

$$\text{Vpref1}v = (1-\beta)\text{Vdcref} - (1-\alpha)\text{Vacrefv} + \text{Vccref1}v \quad (13)$$

$$\text{Vpref1}w = (1-\beta)\text{Vdcref} - (1-\alpha)\text{Vacrefw} + \text{Vccref1}w \quad (14)$$

$$\text{Vnref1}u = (1-\beta)\text{Vdcref} + (1-\alpha)\text{Vacrefu} + \text{Vccref1}u \quad (15)$$

$$\text{Vnref1}v = (1-\beta)\text{Vdcref} + (1-\alpha)\text{Vacrefv} + \text{Vccref1}v \quad (16)$$

$$\text{Vnref1}w = (1-\beta)\text{Vdcref} + (1-\alpha)\text{Vacrefw} + \text{Vccref1}w \quad (17)$$

$$\text{Vn} = \text{Vacrefu} + \text{Vacrefv} + \text{Vacrefw} \quad (18)$$

$$\text{Vccref1}u + \text{Vccref1}v + \text{Vccref1}w = 0 \quad (19)$$

From these equations, it is understood that circulating voltage instruction value Vccref1 does not contribute to fluctuation of AC voltage Vac and DC voltage Vdc.

For example, in leg circuit 4u of FIG. 1, when cell groups 51, 52 outputs the AC voltage having a relatively small value and when cell groups 61, 62 outputs the AC voltage having a relatively large value, the potential of AC terminal Nu approaches the potential of positive DC terminal Np, and a high voltage is output to AC terminal Nu. Specifically, cell groups 61, 62 outputs the AC voltage having the same polarity as the AC voltage to be output from AC terminal Nu, and cell groups 51, 52 outputs the AC voltage having the opposite polarity to the AC voltage to be output from AC terminal Nu.

(Operation of Capacitor Voltage Controller 527)

The voltage at capacitor 32 of each converter cell 7b constituting each of cell groups 52, 62 is detected by voltage detector 33. Voltage arithmetic unit 522 operates capacitor voltages Vcpu2, Vcpv2, Vcpw2 of converter cells 7b of cell group 52 and capacitor voltages Vcnu2, Vcnv2, Vcnw2 (simply referred to as "capacitor voltage") of converter cells 7b of cell group 62.

The compensator provided in capacitor voltage controller 527 performs control operation on the circulating current instruction value such that the capacitor voltages at cell groups 52, 62 of the respective phases follow the capacitor voltage instruction value, and the compensator outputs the circulating current instruction value to circulating current controller 526.

Specifically, capacitor voltage controller 527 generates circulating current instruction values Iccprefu, Iccprefv, Iccprefw for the U-phase, the V-phase, and the W-phase that compensate for the deviation between the average value of capacitor voltages Vcpu2, Vcpv2, Vcpw2, Vcnu2, Vcnv2, Vcnw2 and the capacitor voltage instruction value. In addition, capacitor voltage controller 527 generates circulating current instruction values Iccnrefu, Iccnrefv, Iccnrefw for the U-phase, the V-phase, and the W-phase that compensate for the deviation between capacitor voltage Vcpu2 and capacitor voltage Vcnu2, the deviation between capacitor voltage Vcpv2 and capacitor voltage Vcnv2, and the deviation between capacitor voltage Vcpw2 and capacitor voltage Vcnw2, respectively.

Then, capacitor voltage controller 527 adds and combines circulating current instruction value Iccprefu and circulating current instruction value Iccnrefu to generate a U-phase circulating current instruction value Iccrefu. Capacitor voltage controller 527 adds and combines circulating current instruction value Iccprefv and circulating current instruction value Iccnrefv to generate V-phase circulating current instruction value Iccrefv, and adds and combines circulating current instruction value Iccprefw and circulating current instruction value Iccnrefw to generate W-phase circulating current instruction value Iccrefw. Circulating current instruction values Iccrefu, Iccrefv, Iccrefw are also collectively referred to as a circulating current instruction value Iccref.

(Operation of Circulating Current Controller 526)

U-phase, V-phase, W-phase circulating currents Iccu, Iccv, Iccw operated by current arithmetic unit 521 are sent to circulating current controller 526. Circulating current controller 526 performs feedback control such that the circulating current value is matched with the circulating current instruction value. That is, a compensator that amplifies a deviation between the circulating current instruction value and the circulating current value is provided in circulating current controller 526. Circulating current controller 526 outputs voltage components to be output by cell groups 52, 62 for the circulating current control as circulating voltage instruction value Vccref2.

Specifically, circulating current controller 526 generates circulating voltage instruction value Vccref2u for the U-phase that compensates for (that is, the deviation is set to zero) the deviation between circulating current Iccu and circulating current instruction value Iccrefu. Similarly, circulating current controller 526 generates circulating voltage instruction value Vccref2v for the V-phase that compensates for the deviation between circulating current Iccv and circulating current instruction value Iccrefv, and generates circulating voltage instruction value Vccref2w for the W-phase that compensates for the deviation between circulating current Iccw and circulating current instruction value Iccrefw. Circulating voltage instruction values Vccref2u, Vccref2u, Vccref2w are also collectively referred to as a circulating voltage instruction value Vccref2.

The circulating current is a current flowing between legs of different phases. Cell groups 51, 61 and reactors 8A, 8B exist in a current path of the circulating current, and the circulating current is generated by applying the potential difference generated by switching of cell groups 51, 61 to reactors 8A, 8B. Accordingly, when voltages of opposite polarities are applied to the reactor by cell groups 52, 62 provided in the same path, the circulating current is prevented.

For example, in the case where circulating current Iccu flows from the positive-side DC terminal to the negative-side DC terminal of leg circuit 4u, the voltage in the direction in which the circulating current is decreased is applied to the reactors 8A, 8B when the positive voltage is output in each of cell groups 52, 62 of leg circuit 4u. When the current flows in the reverse direction of the above, the circulating current is attenuated when the voltages at cell groups 52, 62 are also applied in the reverse direction. Circulating current controller 526 executes feedback control such that the circulating current instruction value and the circulating current value are matched with each other.

(Operations of Adder-Subtractor 5i and Adder 5j)

Adder-subtractor 5i subtracts and combines a value obtained by multiplying AC voltage instruction value Vacref by a times to circulating voltage instruction value Vccref2 for the circulating current control, and adds and combines a value obtained by multiplying DC voltage instruction value Vdcref by β times. The addition result of adder-subtractor 5i is input to positive-side cell group controller 503Pb as a voltage instruction value Vpref2 (for U-phase: Vpref2u, for V-phase: Vpref2v, for W-phase: Vpref2w) representing the voltage component to be output from cell group 52 for the circulating current control.

Adder 5j adds and combines a value obtained by multiplying the AC voltage instruction value Vacref by α times to circulating voltage instruction value Vccref2 for the circulating current control, and adds and combines a value obtained by multiplying DC voltage instruction value Vdcref by β times. The addition result of adder 5j is input to negative-side cell group controller 503Nb as a voltage instruction value Vnref2 (for U phase: Vnref2u, for V phase: Vnref2v, for W phase: Vnref2w) representing the voltage component to be output from cell group 62 for the circulating current control.

Specifically, voltage instruction values Vpref2u, Vpref2v, Vpref2w, Vnref2u, Vnref2v, Vnref2w are expressed as the following Equations (20) to (25). The following Equation (26) holds for the circulating voltage instruction value Vccref2.

$$Vpref2u = \beta Vdcref - \alpha Vacrefu + Vccref2u \quad (20)$$

$$Vpref2v = \beta Vdcref - \alpha Vacrefv + Vccref2v \quad (21)$$

$$Vpref2w = \beta Vdcref - \alpha Vacrefw + Vccref2w \quad (22)$$

$$Vnref2u = \beta Vdcref + \alpha Vacrefu + Vccref2u \quad (23)$$

$$Vnref2v = \beta Vdcref + \alpha Vacrefv + Vccref2v \quad (24)$$

$$Vnref2w = \beta Vdcref + \alpha Vacrefw + Vccref2w \quad (25)$$

$$Vccref2u + Vccref2v + Vccref2w = 0 \quad (26)$$

From these equations, it is understood that circulating voltage instruction value Vccref2 does not contribute to fluctuation of AC voltage Vac and DC voltage Vdc.

(Equivalent Circuit of Power Conversion Circuit Unit 2)

In the embodiment, control device 3 having the above configuration gives circulating voltage instruction value Vccref1 that fluctuates the circulating current to converter cells 7a included in cell groups 51, 61, and promotes the charge of capacitors 32 of converter cells 7b included in cell groups 52, 62 for the circulating current control by the fluctuation of the circulating current. Thus, unbalance of the capacitor voltages of converter cell 7a and converter cell 7b that have different operations is prevented. In order to facilitate understanding of the feature of the embodiment, the description will be given using an equivalent circuit of power conversion circuit unit 2.

Figure 5:
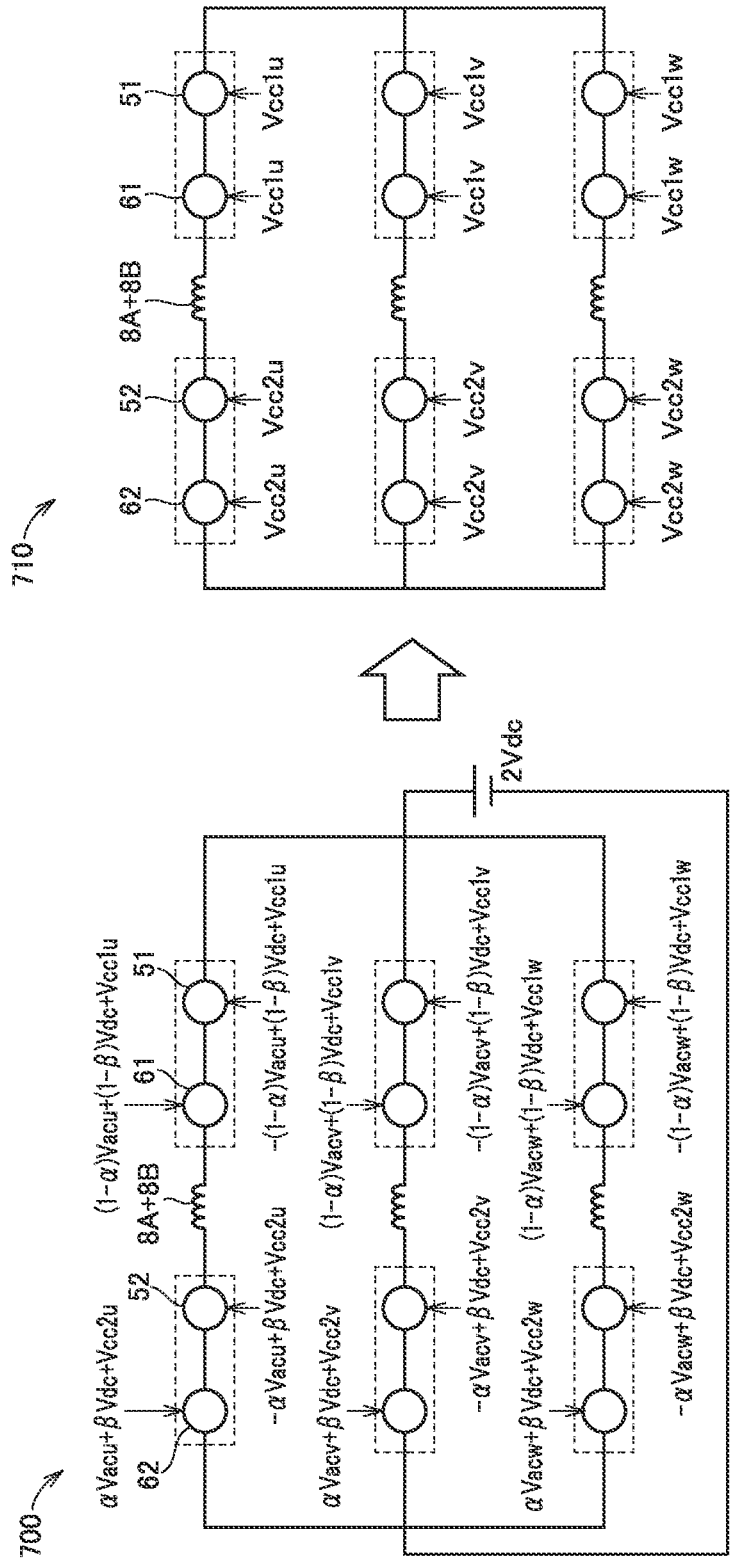
FIG. 5 is a view illustrating an equivalent circuit of a power conversion circuit unit.

FIG. 5 is a view illustrating the equivalent circuit of power conversion circuit unit 2. An equivalent circuit 700 in FIG. 5 is an equivalent circuit that does not include AC circuit 12. In equivalent circuit 700, because AC circuit 12 is not included in the current path, the node (that is, AC terminals Nu, Nv, Nw) in leg circuit 4 is eliminated, and the disposition of the components can be changed in leg circuit 4. For ease of description, in equivalent circuit 700, cell groups 51, 61 including converter cell 7a are disposed adjacent to each other, cell groups 52, 62 including converter cell 7b are disposed adjacent to each other, and reactors 8A, 8B are collectively described as one reactor.

In equivalent circuit 700, because AC voltage instruction values given to U-phase cell groups 52, 62 are αVacuref, −αVacuref (described as "αVacu", "−αVacu" in FIG. 5, hereinafter, the same applies to other instruction values), AC voltage instruction values cancel each other. The AC voltage instruction values given to U-phase cell groups 51, 61 also cancel each other. Consequently, components related to the AC current output (that is, the AC voltage instruction value) cancel each other between positive-side arm 5 and negative-side arm 6. Similarly, in the V phase and the W phase, the components related to the AC current output cancel each other.

The total value of the DC voltage instruction values of respective cell groups 51, 61, 52, 62 of the U-phase is 2Vdc. Similarly, in the V phase and the W phase, the total value of the DC voltage instruction values is 2Vdc. Consequently, the DC voltage (corresponding to 2Vdc in FIG. 5) including a voltage drop due to impedance of DC circuit 14 cancels the total DC voltage of positive-side arm 5 and negative-side arm 6. As described above, the components related to the DC current output in each phase cancel the DC voltage of DC circuit 14.

From this, in each phase, only circulating voltage instruction values Vccref1u, Vccref2u remain as components not related to the AC current output and the DC current output, so that equivalent circuit 700 can be changed as equivalent circuit 710. Equivalent circuit 710 is a closed circuit not including (that is, the AC current and the DC current were ignored) AC circuit 12 and DC circuit 14 as a path through which the current flows, and only the circulating current flows through the current path of the closed circuit. Accordingly, hereinafter, equivalent circuit 710 is also referred to as a circulation circuit 710.

In each phase of circulation circuit 710, when cell groups 51, 61 including converter cell 7a output the circulating voltage according to circulating voltage instruction value Vccref1, cell groups 52, 62 including converter cell 7b control the amplitude and the phase of circulating voltage instruction value Vccref2, so that the power interchanged between cell groups 51, 61 and cell groups 52, 62 can be controlled.

Accordingly, in the embodiment, control device 3 operates each converter cell 7a of cell groups 51, 61 as a voltage source that outputs the circulating voltage (for example, the circulating voltage according to circulating voltage instruction value Vccref1) in circulating circuit 710, and operates each converter cell 7b of cell groups 52, 62 to control the circulating current in circulating circuit 710. Thus, the capacitor voltage at converter cell 7a and the capacitor voltage at converter cell 7b are controlled to be balanced.

More specifically, capacitor voltage controller 527 outputs an instruction value (that is, circulating current instruction value Iccref) of the circulating current to circulating current controller 526 in order to cause the capacitor voltage at each converter cell 7b to follow the capacitor voltage instruction value. Circulating current controller 526 generates circulating voltage instruction value Vccref2 that compensates for the deviation between circulating current Iccu and circulating current instruction value Iccrefu, and operates cell groups 52, 62 using circulating voltage instruction value Vccref2. That is, control device 3 operates converter cell 7b such that the circulating current for causing the capacitor voltage of each converter cell 7b to follow the capacitor voltage instruction value flows through circulating circuit 710.

The capacitor voltage at converter cell 7b constituting cell groups 52, 62 is preferably balanced (for example, the same) with the capacitor voltage at converter cell 7a constituting cell groups 51, 61. Accordingly, the capacitor voltage instruction value given to capacitor voltage controller 527 is set to such a value that the capacitor voltage at converter cell 7b follows the capacitor voltage at converter cell 7a. For example, when the capacitor voltage at each converter cell 7a is maintained at rated value Vs, control device 3 sets the capacitor voltage instruction value given to capacitor voltage controller 527 to rated value Vs, and causes the capacitor voltage at each converter cell 7b to follow rated value Vs.

At this point, because the circulating current is the current that does not include AC circuit 12 and DC circuit 14 in the path, the influence on AC circuit 12 and DC circuit 14 is prevented even when the circulating current flows. However, when the circulating current including the DC component flows, the component related to the DC current output cannot be ignored, so that the average value of each phase of the capacitor voltages of cell groups 51, 61 varies. When the circulating current including a fundamental frequency component of AC circuit 12 flows, the component related to the AC current output cannot be ignored, so that the average value of the capacitor voltage of cell group 51 and the average value of the capacitor voltage of cell group 61 vary.

Consequently, control device 3 generates the circulating current including the fundamental frequency component of AC circuit 12 and the frequency component other than the DC component, and operates cell groups 52, 62 so as to flow the circulating current. Specifically, circulating current controller 526 generates circulating voltage instruction value Vccref2 that allows the circulating current including the fundamental frequency component and the frequency component other than the DC component to flow.

In order to flow the circulating current including the fundamental frequency component and the frequency component other than the DC component as described above, the circulating voltage output from cell groups 51, 61 as the voltage source desirably does not include the fundamental frequency component and the frequency component of the DC component. For this reason, control device 3 sets circulating voltage instruction values Vccref1 to cell groups 51, 61 such that circulating voltage instruction values Vccref1 do not include the fundamental frequency component and the frequency component of the DC component.

(Method for Setting Gains α, β)

As described above, in the embodiment, AC voltage instruction value Vacref is divided into AC voltage instruction value Vacref1 for cell groups 51, 61 and AC voltage instruction value Vacref2 for cell groups 52, 62. DC voltage instruction value Vdcref is divided into DC voltage instruction value Vdcref1 for cell groups 51, 61 and DC voltage instruction value Vdcref2 for cell groups 52, 62. Thus, AC-DC conversion control of power conversion device 1 is implemented by operating cell groups 51, 61 according to the respective instruction values and operating cell groups 52, 62 according to the respective instruction values.

At this point, it is assumed that converter cells 7a constituting cell groups 51, 61 have the half-bridge configuration, and it is assumed that converter cells 7b constituting cell groups 52, 62 have the full-bridge configuration. In this case, the outputtable voltage at converter cell 7a is the zero voltage and the capacitor voltage, and the outputtable voltage at converter cell 7b is the zero voltage, the positive capacitor voltage, and the negative capacitor voltage.

For example, assuming that α=0.5 and β=0.5, it is assumed that the voltage fluctuation is generated in AC circuit 12 and DC circuit 14 to obtain "(1−α)|Vacref|>(1−β)|Vdcref|". "||" represents an absolute value. In this case, sometimes voltage instruction value Vpref1 becomes a negative voltage from Equations (12) to (14), because cell group 51 cannot output a negative voltage, a desired voltage output cannot be performed. On the other hand, because cell groups 52, 62 can output the negative voltages, the voltage instruction values of cell groups 51, 61 can be set within a voltage range that can be output by appropriately setting gains α, β. Specifically, gains α, β are set so as to satisfy the following conditions (A) to (D).

$(1-\beta)|Vdcref|-(1-\alpha)|Vacref| \geq 0$      (A)

$(1-\beta)|Vdcref|+(1-\alpha)|Vacref| \leq$ (total value Vsuma of capacitor voltages of respective converter cells 7a)      (B)

$\alpha|Vacref|-\beta|Vdcref| \leq$ (total value Vsumb of capacitor voltages of respective converter cells 7b)      (C)

$\alpha|Vacref|+\beta|Vdcref| \leq$ (total value Vsumb of capacitor voltages of respective converter cells 7b)      (D)

The condition (1) is a condition for setting voltage instruction value Vpref1 provided to cell group 51 to equal to or greater than zero. The condition (2) is a condition for setting voltage instruction value Vnref1 provided to cell group 61 to equal to or less than Vsuma. The condition (3) is a condition for setting voltage instruction value Vpref2 provided to cell group 52 to equal to or greater than "−Vsumb". The condition (4) is a condition for setting voltage instruction value Vnref2 provided to cell group 62 to equal to or less than Vsumb. By setting gains α, β satisfying the above conditions (1) to (4), the AC-DC conversion control that can also output the negative voltage within the voltage range that can be output by each of cell groups 51, 52 and cell groups 61, 62 can be performed, so that the operation range of power conversion device 1 can be expanded. For example, in order to continue the operation when the short-circuit fault is generated in DC circuit 14, the fault current can be prevented by setting the DC voltage of each converter cell 7 to zero.

When gains α, β are changed, the energy balance is lost and the capacitor voltage temporarily fluctuates, but the capacitor voltages at converter cells 7a, 7b can be controlled to be balanced by performing the control using the circulating current described above.

However, when the operation is not required to be continued at the time of the generation of the short-circuit fault in DC circuit 14, gains α, β may be set to zero. When α=0, β=0 are set, cell groups 52, 62 perform only the circulating current control without performing the AC-DC conversion control. For this reason, the AC-DC conversion control is performed only by cell groups 51, 61. Specifically, the instruction value of the AC voltage output from power conversion device 1 to AC circuit 12 is the AC voltage instruction value for each converter cell 7a included in cell groups 51, 61, and the instruction value of the DC voltage output from power conversion device 1 to DC circuit 14 is the DC voltage instruction value for each converter cell 7a.

In this case, because cell groups 52, 62 do not need to perform the AC-DC conversion control, the maximum output voltage can be prevented, and as a result, the number of converter cells included in cell groups 52, 62 can be minimized. For example, the maximum output voltage output from cell groups 52, 62 may be a voltage that can oppose the circulating voltage output from cell groups 51, 61.

(Configuration of Cell Group Controller 503)

Figure 6:
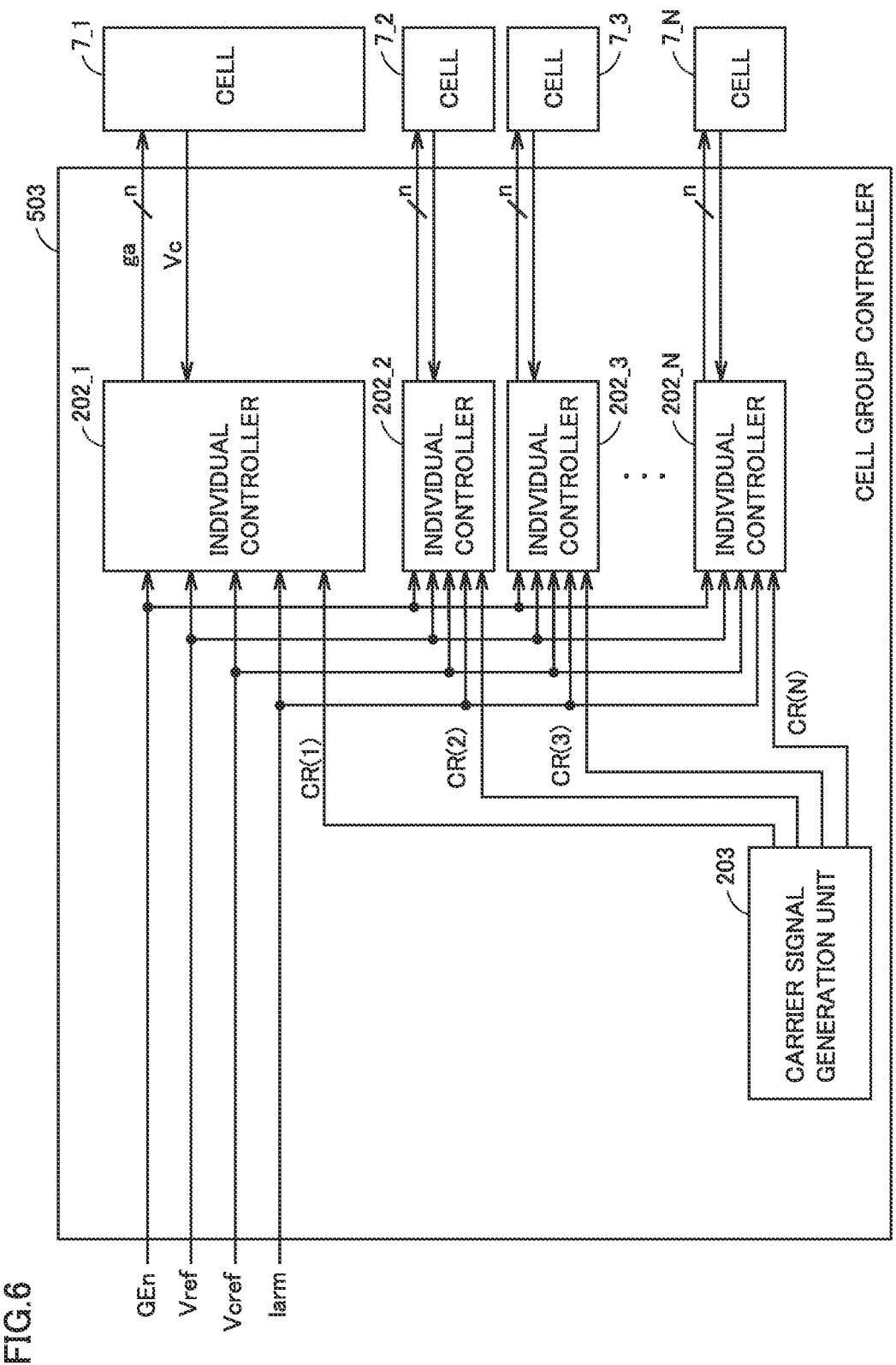
FIG. 6 is a view illustrating a configuration of a cell group controller.

FIG. 6 is a view illustrating a configuration of cell group controller 503. With reference to FIG. 6, cell group controller 503 includes N individual controllers 202_1 to 202_N (hereinafter, also collectively referred to as an "individual controllers 202"). For example, N1 converter cells 7a are included in cell groups 51, 61. Accordingly, each of positive-side cell group controller 503Pa and negative-side cell group controller 503Na corresponding to cell groups 51, 61 includes N1 individual controllers 202. Hereinafter, for the sake of description, voltage instruction values Vpref1, Vnref1, Vpref2, Vnref2 will be collectively referred to as a voltage instruction value Vref.

Individual controller 202_i individually controls corresponding converter cells 7. Individual controller 202_i receives voltage instruction value Vref, arm current Iarm, capacitor voltage instruction value Vcref, and a switching permission signal GEn from basic controller 502. Capacitor voltage instruction value Vcref and switching permission signal GEn are generated by basic controller 502. For example, capacitor voltage instruction value Vcref is a rated value of capacitors 32 of the plurality of converter cells 7 included in each cell group. Individual controller 202_i receives capacitor voltage Vc from corresponding converter cell 7_i. Individual controller 202_i transmits capacitor voltage Vc to basic controller 502.

When switching permission signal GEn is "1", each switching element 31 of converter cell 7 can perform on and off switching operation by gate signal ga. Switching permission signal GEn "1" means that converter cell 7 is in a deblocked state.

When switching permission signal GEn is "0", all switching elements 31 of converter cell 7 are turned off by gate signal ga. Switching permission signal GEn "0" means that converter cell 7 is in a gate block state. For example, when an accident is generated in the power system or when transient operation is difficult, basic controller 502 generates switching permission signal GEn having the value of "0" and outputs switching permission signal GEn to individual controller 202.

Carrier signal generation unit 203 sets a reference phase of the carrier signal for each converter cell 7, and generates the carrier signal having the set reference phase. Specifically, carrier signal generation unit 203 sets an interval between the reference phases (hereinafter, also referred to as a "carrier reference phase") of the plurality of carrier signals CR(i) to an interval obtained by dividing 360 degrees by the number N of the plurality of converter cells 7_i. The reference phase of carrier signal CR(i) represents a difference between the phase of carrier signal CR(i) and a reference phase. The phase of a carrier signal CR (0) can be used as the reference phase. Carrier signal generation unit 203 generates carrier signals CR (1) to CR (N) having the set carrier reference phase.

Individual controller 202_i receives a carrier signal CRi from carrier signal generation unit 203. Individual controller 202_i performs pulse width modulation (PWM) control on converter cell 7_i using carrier signal CRi. Specifically, when switching enabling signal GEn is "1" (that is, the converter cell 7_i is in the deblock state), individual controller 202_i modulates voltage instruction value Vref and carrier signal CRi of converter cell 7_i by the phase shift PWM method, thereby generating gate signal ga (for example, a PWM modulation signal) and outputting gate signal ga to converter cell 7_i. Individual controller 202_i performs modulation according to the configuration of converter cell 7_i. In the configuration of converter cell 7_i, the number n of PWM modulation signals to be output also increases or decreases. For example, n=2 for the converter cell in the half-bridge configuration, and n=4 for the converter cell in the full-bridge configuration.

Advantages

According to the embodiment, in power conversion device 1 including the cell group for the AC-DC conversion control and the cell group for the circulating current control, the voltage at the capacitor can be appropriately controlled even when the arm current is small.

Other Embodiments (1) In the above-described embodiments, in each of reactors 8A, 8B, only positive-side reactor 8A or only negative-side reactor 8B may be provided in each leg circuit 4. When only negative-side reactor 8B is provided, cell group 52 for the circulating current control becomes unnecessary, and positive-side cell group controller 503Pb and adder-subtractor 5i related to cell group 52 are also unnecessary. Therefore, there is an advantage that the configuration of control device 3 can be simplified. Similarly, when only positive-side reactor 8A is provided, cell group 62 for the circulating current control becomes unnecessary, and negative-side cell group controller 503Nb and adder 5j related to cell group 62 are also unnecessary. Therefore, there is an advantage that the configuration of control device 3 can be simplified.

Figure 7:
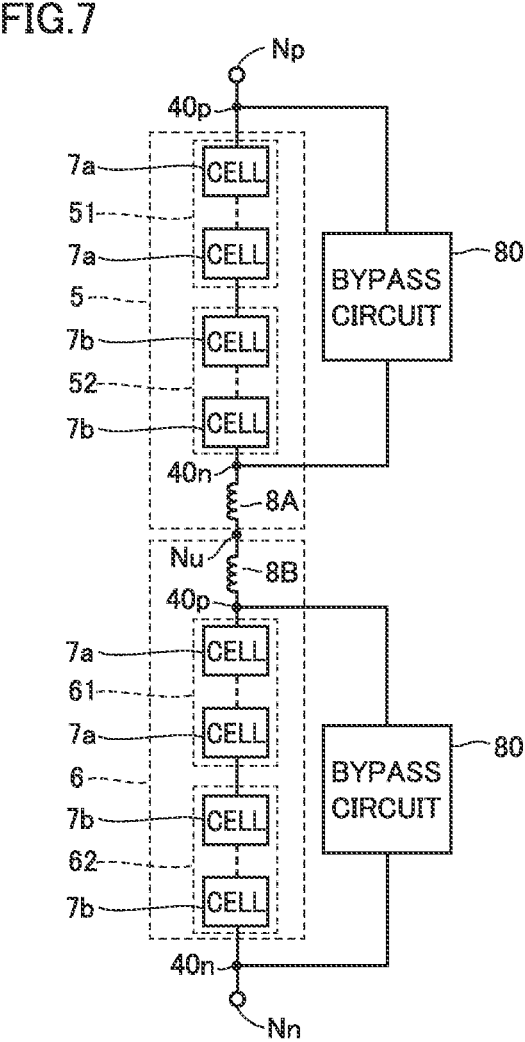
FIG. 7 is a circuit diagram illustrating a connection example of a bypass circuit.

(2) In the above-described embodiment, a bypass circuit may be electrically connected in parallel to each arm. FIG. 7 is a circuit diagram illustrating a connection example of the bypass circuit. With reference to FIG. 7, positive-side arm 5 is electrically connected in parallel (that is, between external connection nodes 40p, 40n of positive-side arm 5) to bypass circuit 80. Negative-side arm 6 is electrically connected in parallel to bypass circuit 80.

Each bypass circuit 80 is provided such that the short-circuit current flowing in the event of the short-circuit fault in DC circuit 14 is shunted to each arm and bypass circuit 80. Specifically, each bypass circuit 80 includes at least one diode that is disposed such that the direction from negative-side DC terminal Nn to positive-side DC terminal Np is the forward direction. For example, bypass circuit 80 includes a plurality of diodes connected in series to each other, a cathode of each diode is provided on the positive side, and an anode of each diode is provided on the negative side.

In the event of the short-circuit fault in DC circuit 14, the short-circuit current flows from external connection node 40n on the low potential side to external connection node 40p on the high potential side, so that the short-circuit current can flow through the plurality of diodes of each bypass circuit 80. This protects each converter cell 7. On the other hand, when the DC voltage is applied such that external connection node 40p is on the high potential side while external connection node 40n is on the low potential side in the normal state of DC circuit 14, the current does not flow through bypass circuit 80 because the direction is opposite to each diode. Thus, the operation of each arm in the normal state of DC circuit 14 is not hindered.

Control device 3 determines whether the short-circuit fault of DC circuit 14 is generated based on the current flowing through each converter cell 7. For example, when at least one of the absolute values of arm currents Ipu, Ipv, Ipw, Inu, Inv, Inw detected by arm current detectors 9A, 9B exceeds a threshold, or when each phase total value of the arm currents exceeds the threshold, control device 3 determines that the short-circuit fault of DC circuit 14 is generated.

When determining that the short-circuit fault in DC circuit 14 is generated (that is, when the short-circuit fault is detected), control device 3 turns off switching elements 31p, 31n of converter cells 7a included in positive-side arm 5 and negative-side arm 6 (that is, each converter cell 7a is stopped). Furthermore, control device 3 controls each switching element 31 of each converter cell 7b included in each of positive-side arm 5 and negative-side arm 6 to shunt the short-circuit current of DC circuit 14 to the arm and bypass circuit 80. Specifically, control device 3 controls each switching element 31 of each converter cell 7b so as to output the voltage preventing the short circuit current from each converter cell 7b. Thus, the short-circuit current is divided into each arm and bypass circuit 80. Control device 3 can also completely commutate the short circuit current to the side of bypass circuit 80 without flowing the short circuit current into each arm by increasing the voltage suppressing the short circuit current from each converter cell 7b. As a result, the elements constituting converter cells 7a, 7b are protected.

(3) The configuration exemplified as the above-described embodiment is an example of the configuration of the present disclosure, and can be combined with another known technique, or can be modified, for example, partially omitted without departing from the gist of the present disclosure. In addition, in the above-described embodiments, the processing and configuration described in other embodiments may be appropriately adopted and implemented.

It should be considered that the disclosed embodiment is an example in all respects and not restrictive. The scope of the present disclosure is defined by not the description above, but the claims, and it is intended that all modifications within the meaning and scope of the claims and their equivalents are included in the present disclosure.

REFERENCE SIGNS LIST

1: power conversion device, 2: power conversion circuit unit, 3: control device, 4u, 4v, 4w: leg circuit, 5: positive-side arm, 5g, 5h: gain circuit, 5i: adder-subtractor, 5j: adder, 6: negative-side arm, 7a, 7b: converter cell, 8A, 8B: reactor, 9A, 9B: arm current detector, 10: AC voltage detector, 11A, 11B: DC voltage detector, 12: AC circuit, 13: transformer, 14: DC circuit, 16: AC current detector, 31n1, 31n2, 31n, 31p1, 31p, 31p2: switching element, 32: capacitor, 33: voltage detector, 34: bypass switch, 40n, 40p: external connection node, 51, 52, 61, 62: cell group, 80: bypass circuit, 202: individual controller, 203: carrier signal generation unit, 501, 501a, 501b: switching controller, 502, 502a, 502b: basic controller, 503, 503a, 503b: cell group controller, 503Na, 503Nb: negative-side cell group controller, 503Pa, 503Pb: positive-side cell group controller, 521: current arithmetic unit, 522: voltage arithmetic unit, 523: AC controller, 524: DC controller, 525: instruction generation unit, 526: circulating current controller, 527: capacitor voltage controller, 700, 710: equivalent circuit

The invention claimed is:

1. A power conversion device that performs power conversion between a DC circuit and an AC circuit, the power conversion device comprising:
    a power conversion circuit unit including a plurality of leg circuits corresponding to a plurality of phases of the AC circuit, each of the leg circuits including a plurality of converter cells each having a capacitor and connected in series to each other, each of the plurality of converter cells being a first converter cell including at least two switching elements or a second converter cell including at least four switching elements; and
    a control device to control operations of the plurality of converter cells,
wherein
the control device
    operates a plurality of the first converter cells that are controlled not based on a circulating current circulating between the plurality of leg circuits as a voltage source that outputs a circulating voltage in a circulating circuit indicating a closed circuit not including the DC circuit and the AC circuit, and
    operates a plurality of the second converter cells to control the circulating current in the circulating circuit.

2. The power conversion device according to claim 1, wherein the control device operates the second converter cell such that a circulating current for causing a voltage at a capacitor of each of the second converter cells to follow a capacitor voltage instruction value flows through the circulating circuit.

3. The power conversion device according to claim 2, wherein the control device sets the capacitor voltage instruction value such that the voltage at the capacitor of each of the second converter cells follows a voltage at a capacitor of each of the first converter cells.

4. The power conversion device according to claim 1, wherein the circulating current includes a fundamental frequency component of the AC circuit and a frequency component other than a DC component.

5. The power conversion device according to claim 1, wherein the circulating voltage does not include the fundamental frequency component of the AC circuit and the DC component.

6. The power conversion device according to claim 1, wherein
    an instruction value of an AC voltage output from the power conversion device to the AC circuit includes a first AC voltage instruction value for the plurality of the first converter cells and a second AC voltage instruction value for the plurality of the second converter cells,
    an instruction value of a DC voltage output from the power conversion device to the DC circuit includes a first DC voltage instruction value for the plurality of the first converter cells and a second DC voltage instruction value for the plurality of the second converter cells,
    the first AC voltage instruction value:the second AC voltage instruction value=$(1-\alpha):\alpha(0<\alpha<1)$ is met, and
    the first DC voltage instruction value:the second DC voltage instruction value=$(1-\beta):\beta(0<\beta<1)$ is met.

7. The power conversion device according to claim 6, wherein the control device sets $\alpha$ and $\beta$ so as to satisfy conditions (1) to (4) below:

$$\{(1-\beta)\times(\text{an absolute value of the instruction value of the DC voltage})\}-\{(1-\alpha)\times(\text{an absolute value of the instruction value of the AC voltage})\}\geq 0, \quad (1)$$

$$\{(1-\beta)\times(\text{an absolute value of the instruction value of the DC voltage})\}+\{(1-\alpha)\times(\text{an absolute value of the instruction value of the AC voltage})\}\leq(\text{a total value of the voltages at the capacitors of the first converter cells}), \quad (2)$$

$$\{\alpha\times(\text{an absolute value of the instruction value of the AC voltage})\}-\{\beta\times(\text{an absolute value of the instruction value of the DC voltage})\}\leq(\text{a total value of the voltages at the capacitors of the second converter cells}), \text{ and} \quad (3)$$

{α×(an absolute value of the instruction value of the AC voltage)+β×(an absolute value of the instruction value of the DC voltage)}≤(a total value of the voltages at the capacitors of the second converter cells).   (4)

8. The power conversion device according to claim 1, wherein
an instruction value of an AC voltage output from the power conversion device to the AC circuit is an AC voltage instruction value for the plurality of the first converter cells, and
an instruction value of a DC voltage output from the power conversion device to the DC circuit is a DC voltage instruction value for the plurality of the first converter cells.

9. The power conversion device according to claim 1, wherein
each of the leg circuits includes a first arm and a second arm,
the first arm includes the plurality of the first converter cells, the plurality of the second converter cells, and a first reactor, and
the second arm includes the plurality of the first converter cells.

10. The power conversion device according to claim 9, wherein the second arm further includes the plurality of the second converter cells and a second reactor.

11. The power conversion device according to claim 9, wherein
each of the first arm and the second arm is connected in parallel to a bypass circuit, and
when detecting a short-circuit fault of the DC circuit,
the control device stops the plurality of the first converter cells included in each of the first arm and the second arm, and
for each of the first arm and the second arm, the control device controls the plurality of the second converter cells included in the arm such that a short-circuit current of the DC circuit is shunted to the arm and the bypass circuit.

12. The power conversion device according to claim 2, wherein the circulating current includes a fundamental frequency component of the AC circuit and a frequency component other than a DC component.

13. The power conversion device according to claim 3, wherein the circulating current includes a fundamental frequency component of the AC circuit and a frequency component other than a DC component.

14. The power conversion device according to claim 2, wherein the circulating voltage does not include the fundamental frequency component of the AC circuit and the DC component.

15. The power conversion device according to claim 3, wherein the circulating voltage does not include the fundamental frequency component of the AC circuit and the DC component.

16. The power conversion device according to claim 4, wherein the circulating voltage does not include the fundamental frequency component of the AC circuit and the DC component.

17. The power conversion device according to claim 2, wherein
an instruction value of an AC voltage output from the power conversion device to the AC circuit includes a first AC voltage instruction value for the plurality of the first converter cells and a second AC voltage instruction value for the plurality of the second converter cells,
an instruction value of a DC voltage output from the power conversion device to the DC circuit includes a first DC voltage instruction value for the plurality of the first converter cells and a second DC voltage instruction value for the plurality of the second converter cells,
the first AC voltage instruction value:the second AC voltage instruction value=$(1-\alpha):\alpha(0<\alpha<1)$ is met, and
the first DC voltage instruction value:the second DC voltage instruction value=$(1-\beta):\beta(0<\beta<1)$ is met.

18. The power conversion device according to claim 3, wherein
an instruction value of an AC voltage output from the power conversion device to the AC circuit includes a first AC voltage instruction value for the plurality of the first converter cells and a second AC voltage instruction value for the plurality of the second converter cells,
an instruction value of a DC voltage output from the power conversion device to the DC circuit includes a first DC voltage instruction value for the plurality of the first converter cells and a second DC voltage instruction value for the plurality of the second converter cells,
the first AC voltage instruction value:the second AC voltage instruction value=$(1-\alpha):\alpha(0<\alpha<1)$ is met, and
the first DC voltage instruction value:the second DC voltage instruction value=$(1-\beta):\beta(0<\beta<1)$ is met.

19. The power conversion device according to claim 4, wherein
an instruction value of an AC voltage output from the power conversion device to the AC circuit includes a first AC voltage instruction value for the plurality of the first converter cells and a second AC voltage instruction value for the plurality of the second converter cells,
an instruction value of a DC voltage output from the power conversion device to the DC circuit includes a first DC voltage instruction value for the plurality of the first converter cells and a second DC voltage instruction value for the plurality of the second converter cells,
the first AC voltage instruction value:the second AC voltage instruction value=$(1-\alpha):\alpha(0<\alpha<1)$ is met, and
the first DC voltage instruction value:the second DC voltage instruction value=$(1-\beta):\beta(0<\beta<1)$ is met.

20. The power conversion device according to claim 5, wherein
an instruction value of an AC voltage output from the power conversion device to the AC circuit includes a first AC voltage instruction value for the plurality of the first converter cells and a second AC voltage instruction value for the plurality of the second converter cells,
an instruction value of a DC voltage output from the power conversion device to the DC circuit includes a first DC voltage instruction value for the plurality of the first converter cells and a second DC voltage instruction value for the plurality of the second converter cells,
the first AC voltage instruction value:the second AC voltage instruction value=$(1-\alpha):\alpha(0<\alpha<1)$ is met, and
the first DC voltage instruction value:the second DC voltage instruction value=$(1-\beta):\beta(0<\beta<1)$ is met.

* * * * *